United States Patent
An et al.

(10) Patent No.: US 12,049,118 B2
(45) Date of Patent: Jul. 30, 2024

(54) MOBILITY VEHICLE

(71) Applicants: Hyundai Motor Company, Seoul (KR); Kia Corporation, Seoul (KR)

(72) Inventors: Jea Kyoo An, Seoul (KR); Hun Keon Ko, Anyang-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 213 days.

(21) Appl. No.: 17/857,697

(22) Filed: Jul. 5, 2022

(65) Prior Publication Data

US 2023/0286348 A1  Sep. 14, 2023

(30) Foreign Application Priority Data

Mar. 10, 2022 (KR) .................... 10-2022-0030193

(51) Int. Cl.
*B60G 21/05* (2006.01)
*B60G 15/02* (2006.01)

(52) U.S. Cl.
CPC ............. *B60G 21/05* (2013.01); *B60G 15/02* (2013.01)

(58) Field of Classification Search
CPC ......... B60G 21/05; B60G 15/02; B60G 3/00; B60G 3/14; B60G 15/08; B60G 21/04
See application file for complete search history.

(56) References Cited

U.S. PATENT DOCUMENTS

| | | | | |
|---|---|---|---|---|
| 1,868,258 A | * | 7/1932 | Schieferstein | B60G 21/04 280/104 |
| 2,166,368 A | * | 7/1939 | Perron | B60G 3/12 280/124.168 |
| 2,840,387 A | * | 6/1958 | Orlandi | B60G 21/04 280/104 |
| 3,815,437 A | * | 6/1974 | Martin | B62D 1/195 74/492 |
| 3,826,514 A | * | 7/1974 | Kolbe | B60G 11/60 280/124.103 |
| 4,627,522 A | * | 12/1986 | Ulrich | B60W 30/1819 74/484 R |
| 4,957,183 A | * | 9/1990 | Mullett | B62D 7/142 180/242 |
| 5,611,555 A | * | 3/1997 | Vidal | B62D 9/02 280/282 |
| 6,131,919 A | | 10/2000 | Lee et al. | |
| 6,170,242 B1 | | 1/2001 | Gordon | |
| 6,217,047 B1 | | 4/2001 | Jeyring et al. | |

(Continued)

FOREIGN PATENT DOCUMENTS

| | | | | |
|---|---|---|---|---|
| EP | 0997373 A1 | * | 5/2000 | ............. B62K 5/00 |
| FR | 2547249 A1 | * | 12/1984 | ............. B60G 21/04 |

(Continued)

*Primary Examiner* — Frank B Vanaman
(74) *Attorney, Agent, or Firm* — Slater Matsil, LLP

(57) ABSTRACT

An embodiment mobility includes a frame unit, a traveling drive unit disposed at a front or rear side of the frame unit and including a traveling wheel and a suspension module configured to change a position of the traveling wheel relative to the frame unit, and a suspension assistant unit having a first side coupled to the frame unit and a second side coupled to the suspension module, the suspension assistant unit including a wire member configured to pull the suspension module and having a first side coupled to the suspension module.

18 Claims, 11 Drawing Sheets

(56) References Cited

U.S. PATENT DOCUMENTS

| | | | |
|---|---|---|---|
| 6,942,230 B1 * | 9/2005 | Fontdecaba Buj | B60G 21/06 280/124.106 |
| 8,317,208 B2 | 11/2012 | Bird | |
| 10,946,741 B1 * | 3/2021 | Kim | B60T 7/06 |
| 11,279,192 B2 | 3/2022 | Bird | |
| 2008/0111336 A1 | 5/2008 | Aubarede et al. | |
| 2011/0084461 A1 | 4/2011 | Bird | |
| 2013/0038037 A1 * | 2/2013 | Madler | B60G 21/073 280/400 |
| 2021/0146740 A1 | 5/2021 | Bird | |

FOREIGN PATENT DOCUMENTS

| | | |
|---|---|---|
| JP | H074111 U | 1/1995 |
| JP | H10181330 A | 7/1998 |
| JP | 2011520701 A | 7/2011 |
| JP | 2020525353 A | 8/2020 |
| KR | 20000031741 A | 6/2000 |
| KR | 20000069708 A | 11/2000 |

* cited by examiner

MOBILITY VEHICLE

CROSS-REFERENCE TO RELATED APPLICATIONS

This application claims the benefit of Korean Patent Application No. 10-2022-0030193, filed on Mar. 10, 2022, which application is hereby incorporated herein by reference.

TECHNICAL FIELD

The present disclosure relates to a mobility.

BACKGROUND

Various types of mobilities are newly in the limelight in addition to traditional automobiles. The automobile and mobility are equipped with suspension systems that provide stable ride quality to occupants and allow the automobile and mobility to operate in response to a state of a road. The suspension systems are classified into a passive suspension system and an active suspension system. When impact caused by a state of the road is applied to wheels, the passive suspension system subsequently absorbs the impact and enables a position of a vehicle body to change relative to the wheels. The active suspension system anticipatively changes the position of the vehicle body relative to the wheels while anticipatively responding to a state of the road. In particular, the active suspension system enables the vehicle body to tilt in one direction when the automobile or mobility turns, thereby ensuring traveling stability for the occupant. The active suspension system is equipped with a motor or the like that provides separate power to change the position of the wheel relative to the vehicle body.

However, in the related art, there is a problem in that a large amount of force is required to operate the active suspension system, and a high-performance motor needs to be mounted in the active suspension system. In addition, in the related art, there is a problem in that a lot of time is required to change the position of the wheel relative to the vehicle body by operating the active suspension system, which causes deterioration in responsiveness.

SUMMARY

The present disclosure relates to a mobility. Particular embodiments relate to a mobility which a person can take.

Embodiments of the present disclosure provide a means capable of providing power for assisting an active suspension system mounted in an automobile or mobility even without mounting a separate motor in the active suspension system, thereby reducing performance of the motor required for the active suspension system, and shortening the time required to operate the active suspension system, thus improving responsiveness.

An exemplary embodiment of the present disclosure provides a mobility including a frame unit, a traveling drive unit disposed at a front or rear side of the frame unit and including a traveling wheel and a suspension module configured to change a position of the traveling wheel relative to the frame unit, and a suspension assistant unit having one side coupled to the frame unit and the other side coupled to the suspension module, the suspension assistant unit being configured to pull the suspension module, in which the suspension assistant unit includes a wire member configured to pull the suspension module and having one side coupled to the suspension module.

The suspension assistant unit may include a first wire fixing region to which one end of the wire member is fixed and a second wire fixing region to which the other end of the wire member is fixed, and the wire member may be shaped to extend from one end of the wire member to the suspension module and then extend to the other end of the wire member.

The suspension assistant unit may include a support member fixed relative to the frame unit and penetrated by the wire member and an elastic module having one side fixedly coupled to the support member, and the first and second wire fixing regions may be fixed relative to the other side of the elastic module.

The elastic module may include a first member fixedly coupled to the support member and a second member coupled to the first member in an insertion manner and movable relative to the first member, and the first and second wire fixing regions may be fixed relative to the second member.

The elastic module may be a gas spring.

The suspension assistant unit may further include a guide module having one side fixed relative to the frame unit and the other side fixed relative to the second member, and the guide module may include a rail member fixed relative to the frame unit and a movable member fixed relative to the second member and movable along the rail member.

The suspension assistant unit may further include a tension adjustment module configured to adjust tension of the wire member, and the tension adjustment module may include a restriction member fixedly coupled to the second wire fixing region and the second member, a bolt member configured to penetrate the restriction member, and a nut member coupled to the bolt member. The bolt member may include a first part disposed outside the restriction member and a second part extending from the first part and facing the first part with a region in which the bolt member penetrates the restriction member interposed therebetween, and the nut member may be coupled to the second part.

The bolt member may penetrate the first wire fixing region, the first part may be disposed between the first wire fixing region and the restriction member, the bolt member may further include a third part extending from the first part and facing the first part with a region in which the bolt member penetrates the first wire fixing region interposed therebetween, and a size of the third part may be larger than a size of a through-hole formed in a region of the first wire fixing region penetrated by the bolt member.

The suspension module may include a suspension power supply member configured to provide a rotational force and a rotary link having one side rotatably connected to the suspension power supply member and the other side coupled to the traveling wheel.

The traveling drive unit may further include a steering module disposed at one side of the traveling wheel and configured to steer the traveling wheel. The steering module may include a steering power supply member configured to provide a rotational force and a link module including a plurality of link members configured to move by receiving the rotational force from the steering power supply member. The link module may include a first link member having one side rotatably coupled to the steering power supply member, a second link member having one side rotatably coupled to the first link member, a third link member having one side rotatably coupled to the second link member, and a fourth link member having one side rotatably coupled to the first link member and the other side rotatably coupled to the third link member, and the traveling wheel may be steered in conjunction with a rotation of the third link member relative to the fourth link member.

The link module may further include a fifth link member fixedly coupled to the traveling wheel and extending in an upward/downward direction in a region in which the third link member and the fourth link member are coupled, and the fifth link member may rotate together with the third link member in conjunction with the rotation of the third link member relative to the fourth link member.

The suspension module may include a first gear configured to rotate about its center by receiving the rotational force from the suspension power supply member, a second gear accommodated in the rotary link and configured to engage with the first gear, and a third gear accommodated in the rotary link and configured to engage with the second gear, and the suspension module may further include a rotation connecting shaft configured to transmit a rotational force of the third gear to the steering module.

The number of teeth of the first gear may be equal to the number of teeth of the third gear.

The suspension module may further include a pulley member disposed at one side of the rotary link, and the wire member may be shaped to extend from one end of the wire member to the pulley member, may be bent at the pulley member, and then may extend to the other end of the wire member.

The pulley member may be rotatable about an axis about which the rotary link is rotatably coupled to the suspension power supply member.

A longitudinal direction L1 in which the rotary link extends may be perpendicular to a direction L2 in which the pulley member is spaced apart from an axis about which the rotary link is rotatably coupled to the suspension power supply member.

The pulley member may be disposed below the axis about which the rotary link is rotatably coupled to the suspension power supply member.

The mobility may include an operation unit coupled to one side of the frame unit, and the operation unit may include a handle member, an operation unit body to which the handle member is coupled, and a pedal unit coupled to the operation unit body and including an accelerator pedal and a brake pedal, a through-hole extending in a forward/rearward direction may be formed in a region of the operation unit body to which the pedal unit is coupled, and the pedal unit may be coupled to the through-hole and configured to be movable in a direction in which the through-hole extends.

The mobility may further include a chair unit coupled to one side of the frame unit, and the chair unit may include a chair body configured to support an occupant and provide a space in which the occupant is seated, a chair body fixing member fixedly coupled to the frame unit and disposed on a lower side of the chair body, and a clamp member fixedly coupled to the chair body and configured to be movable relative to the chair body fixing member.

According to embodiments of the present disclosure, it is possible to provide the means capable of providing power for assisting the active suspension system mounted in the automobile or mobility even without mounting a separate motor in the active suspension system, thereby reducing performance of the motor required for the active suspension system, and shortening the time required to operate the active suspension system, thus improving responsiveness.

Figure 1:
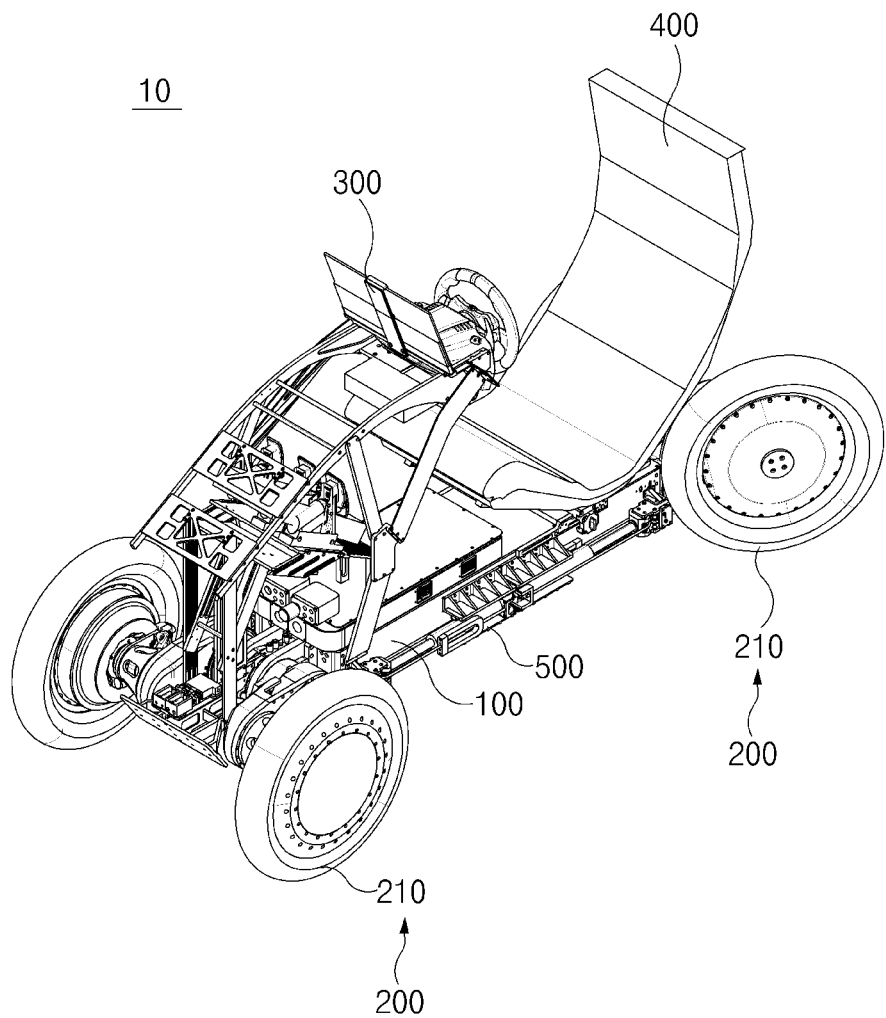
FIG. 1 is a perspective view illustrating a mobility according to embodiments of the present disclosure.

The following reference identifiers may be used in connection with the accompanying drawings to describe exemplary embodiments of the present disclosure.

10: Mobility
100: Frame unit
200: Traveling drive unit
210: Traveling wheel
220: Suspension module
220a: Module housing
221: Suspension power supply member
222: Rotary link
223: First gear
224: Second gear
225: Third gear
226: Rotation connecting shaft
227: Pulley member
230: Steering module
234: Link module
234a: First link member
234b: Second link member
234c: Third link member
234d: Fourth link member
234e: Fifth link member
300: Operation unit
310: Handle member
320: Operation unit body
330: Pedal unit 400: Chair unit
410: Chair body
412: Front inclined region
414: Rear inclined region
420: Chair body fixing member
430: Clamp member
500: Suspension assistant unit
510: Wire member
520: First wire fixing region
530: Second wire fixing region
540: Support member
550: Elastic module
552: First member
554: Second member
560: Guide module
562: Rail member
564: Movable member
570: Tension adjustment module
572: Bolt member
572a: First part
572b: Second part
572c: Third part
574: Nut member
576: Bolt restriction member

DETAILED DESCRIPTION OF ILLUSTRATIVE EMBODIMENTS

Hereinafter, a mobility according to embodiments of the present disclosure will be described with reference to the drawings.

Figure 2:
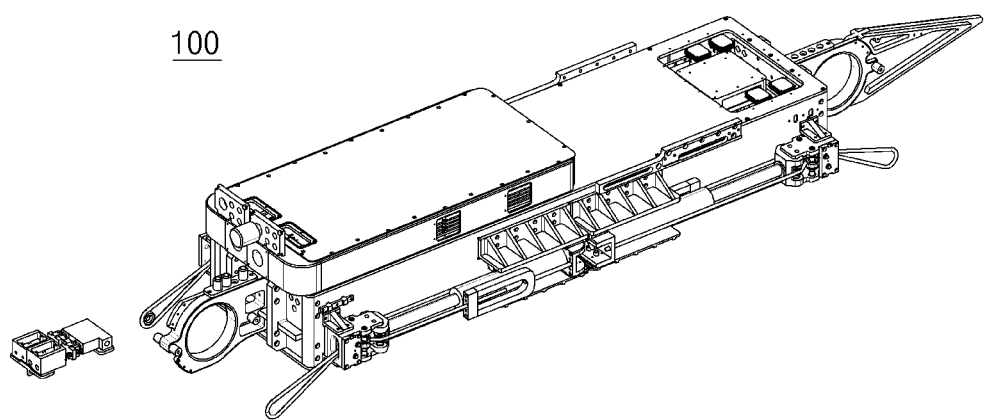
FIG. 2 is a perspective view illustrating a frame unit of the mobility according to embodiments of the present disclosure.
Figure 3:
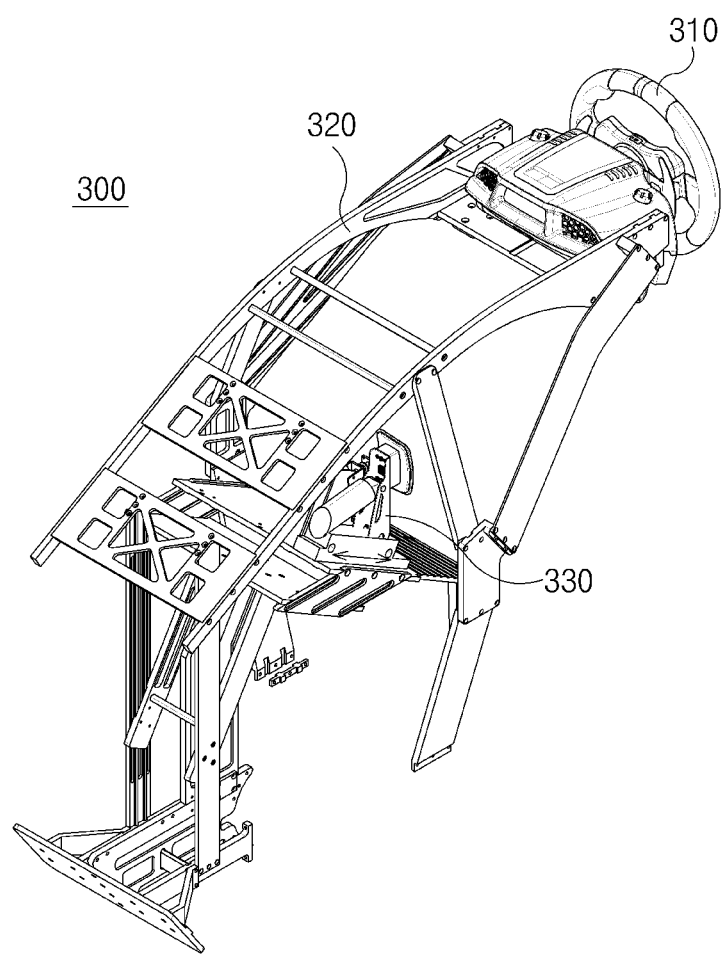
FIG. 3 is a perspective view illustrating an operation unit of the mobility according to embodiments of the present disclosure.
Figure 4:
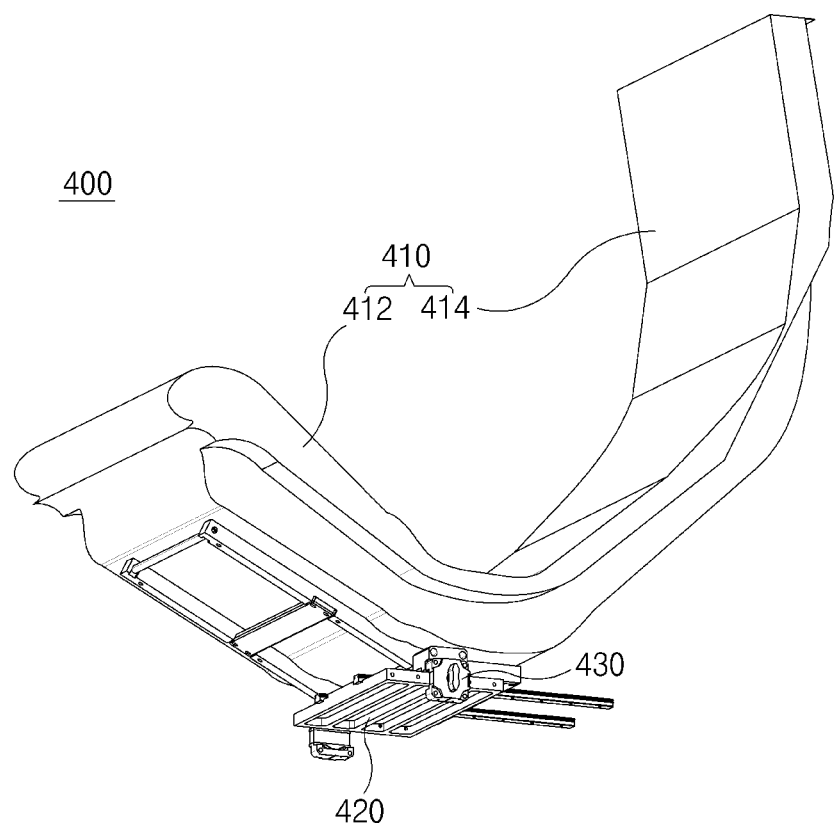
FIG. 4 is a perspective view illustrating a chair unit of the mobility according to embodiments of the present disclosure.

FIG. 1 is a perspective view illustrating a mobility according to embodiments of the present disclosure, and FIG. 2 is a perspective view illustrating a frame unit of the mobility according to embodiments of the present disclosure. FIG. 3 is a perspective view illustrating an operation unit of the mobility according to embodiments of the present disclosure, and FIG. 4 is a perspective view illustrating a chair unit of the mobility according to embodiments of the present disclosure.

Referring to FIGS. 1 to 4, a mobility 10 according to embodiments of the present disclosure may include a frame unit 100. A traveling drive unit, an operation unit, a chair unit, and a suspension assistant unit, which will be described below, may be coupled to the frame unit 100.

The mobility 10 may include a traveling drive unit 200 disposed at a front or rear side of the frame unit 100. The traveling drive unit 200 may serve to move the mobility 10. More specifically, the traveling drive unit 200 may include a traveling wheel 210 and a suspension module 220 configured to change a position of the traveling wheel 210 relative to the frame unit 100. According to embodiments of the present disclosure, when a road slopes in a leftward/rightward direction or an obstacle is present forward of the mobility 10 while the mobility 10 travels, the suspension module 220 may operate and change the position of the traveling wheel 210 relative to the frame unit 100, thereby providing high ride quality to an occupant. More particularly, the traveling drive unit 200 may be coupled directly to the frame unit 100.

The traveling drive unit 200 may be provided in plural, and the plurality of traveling drive units 200 may be disposed in front and rear regions of the mobility 10. FIG. 1 illustrates an example in which two traveling drive units 200 are disposed in each of the front and rear regions of the mobility 10. The plurality of traveling drive units 200 of the mobility 10 may operate independently.

Meanwhile, as illustrated in FIG. 3, the mobility 10 may include an operation unit 300 coupled to one side of the frame unit 100. The operation unit 300 may include a handle member 310, an operation unit body 320 to which the handle member 310 is coupled, and a pedal unit 330 connected to the operation unit body 320 and including an accelerator pedal and a brake pedal. Therefore, the occupant in the mobility 10 may steer the mobility 10 by operating the handle member 310 and accelerate or brake the mobility 10 by operating the pedal unit 330.

In this case, according to embodiments of the present disclosure, a through-hole may be provided in a region of the operation unit body 320 to which the pedal unit 330 is coupled. The through-hole may extend in a forward/rearward direction. The pedal unit 330 may be coupled to the through-hole and configured to be movable in a direction in which the through-hole extends. Therefore, a position of the pedal unit 330 may be adjusted in consideration of a body type of the occupant seated in the mobility 10. Like the pedal unit 330, the handle member 310 may also be coupled to be movable relative to the operation unit body 320. For example, a through-hole may be provided in a region of the operation unit body 320 which is coupled to the handle member 310. The through-hole extends in the forward/rearward direction. The handle member 310 may be coupled to the through-hole and configured to be movable in the direction in which the through-hole extends.

In addition, as illustrated in FIG. 4, the mobility 10 may further include a chair unit 400 coupled to one side of the frame unit 100. The chair unit 400 may serve to provide a space in which the occupant is seated.

The chair unit 400 may include a chair body 410 configured to support the occupant upward and provide a space in which the occupant is seated, a chair body fixing member 420 fixedly coupled to the frame unit 100 and disposed on a lower side of the chair body 410, and a clamp member 430 fixedly coupled to the chair body 410, and configured to be movable relative to the chair body fixing member 420. Therefore, a position of the chair body 410 may be changed to conform to a body type of the occupant seated in the mobility 10.

In addition, for example, as illustrated in FIG. 4, the chair body 410 may include a front inclined region 412 inclined and extending downward in a rearward direction and a rear inclined region 414 connected to the front inclined region 412 and inclined and extending upward in the rearward direction. Therefore, the chair body 410 may have an approximately V-shape.

Figure 5:
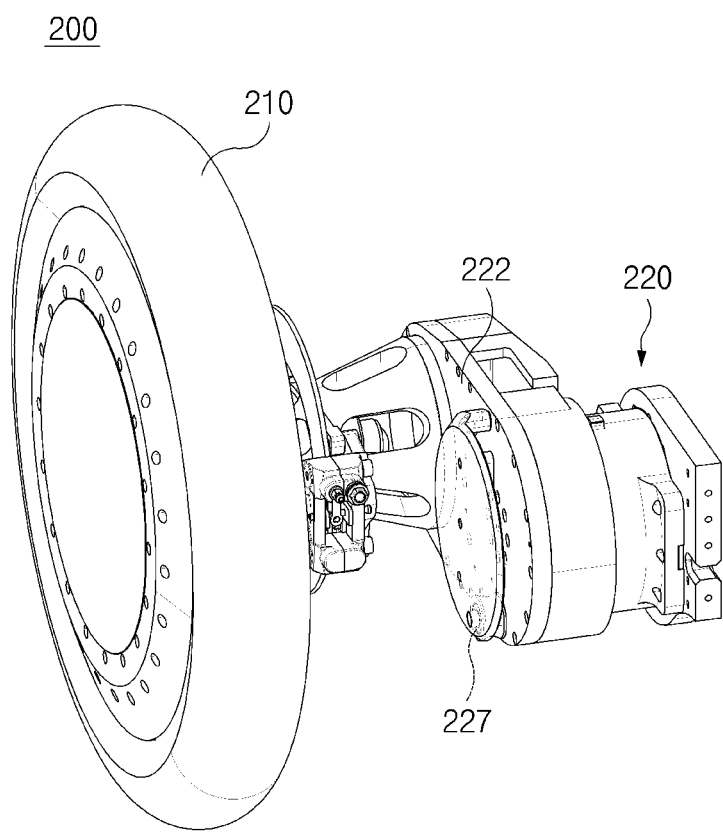
FIG. 5 is an enlarged view of a traveling drive unit disposed at a front side of the mobility according to embodiments of the present disclosure.
Figure 6:
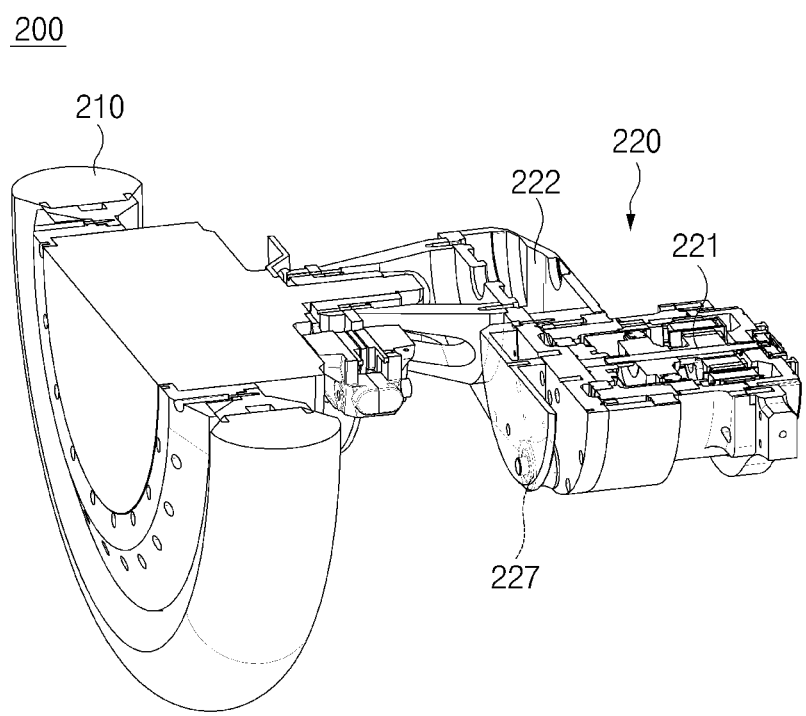
FIG. 6 is an enlarged cross-sectional view of the traveling drive unit disposed at the front side of the mobility according to embodiments of the present disclosure.

FIG. 5 is an enlarged view of the traveling drive unit disposed at the front side of the mobility according to embodiments of the present disclosure, and FIG. 6 is an enlarged cross-sectional view of the traveling drive unit disposed at the front side of the mobility according to embodiments of the present disclosure.

The traveling drive unit disposed at the front side of the mobility 10 will be described below with reference to FIGS. 5 and 6. However, the contents to be described below with reference to FIGS. 5 and 6 may be equally applied to the traveling drive unit disposed at the rear side of the mobility 10.

Referring to FIGS. 5 and 6, the suspension module 220 of the traveling drive unit 200 may include a suspension power supply member 221 configured to provide a rotational force and a rotary link 222 configured to move the traveling wheel 210 and having one side rotatably connected to the suspension power supply member 221 and the other side coupled to the traveling wheel 210. For example, the suspension power supply member 221 may be a motor, and one side of the rotary link 222 may rotate about a rotary shaft of the motor. Meanwhile, it should be understood that the configuration in which the other side of the rotary link 222 is coupled to the traveling wheel 210 means not only that the other side of the rotary link 222 is coupled directly to the traveling wheel 210, but also that the rotary link 222 is coupled to another component (e.g., a steering module to be described below) that mediates between the rotary link 222 and the traveling wheel 210.

According to embodiments of the present disclosure, when the rotary link 222 is rotated about one side of the rotary link 222 by the operation of the suspension power supply member 221, the other side of the rotary link 222 rotates about one side of the rotary link 222. Therefore, the traveling wheel 210 directly or indirectly connected to the rotary link 222 also rotates about one side of the rotary link 222, such that a relative position between the traveling wheel 210 and the frame unit 100 may be adjusted. Meanwhile, the suspension power supply member 221 may further include a speed reducer configured to reduce the rotational force of the motor and transmit the rotational force to the rotary link 222. Meanwhile, as illustrated in FIG. 6, a power source configured to provide power for rotating the traveling wheel 210 of the traveling drive unit 200 may be an in-wheel motor mounted in the traveling wheel 210, but the power source is not limited to the in-wheel motor.

Figure 7:
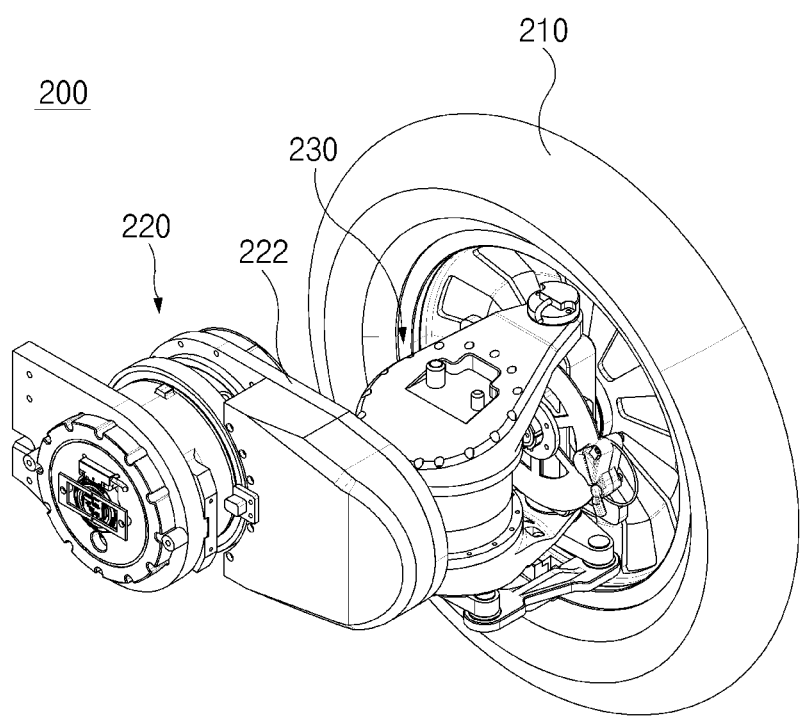
FIG. 7 is an enlarged perspective view of a traveling drive unit disposed at a rear side of the mobility according to embodiments of the present disclosure when viewed in a first direction.
Figure 8:
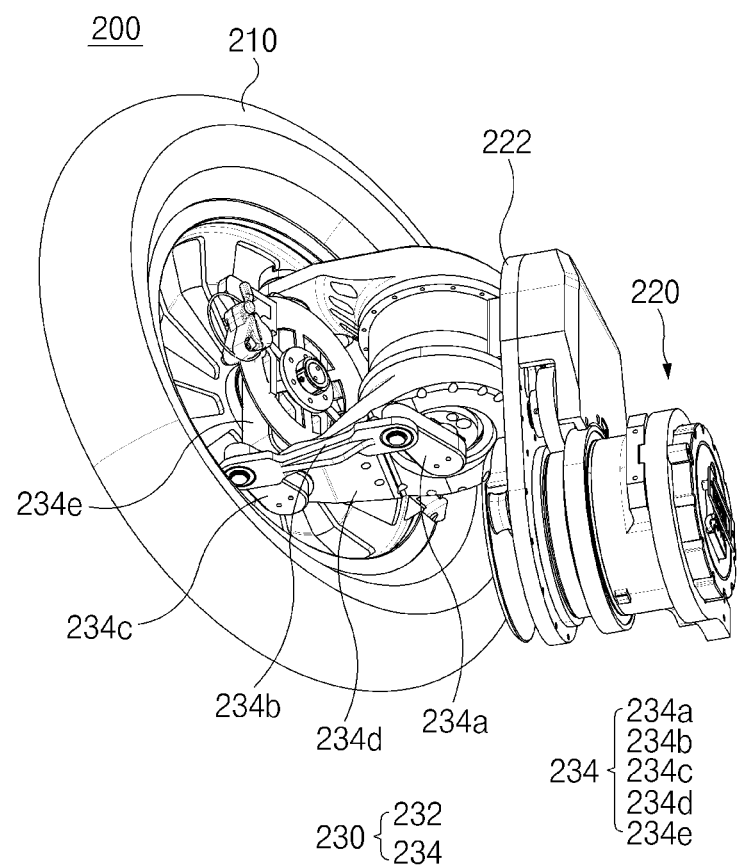
FIG. 8 is an enlarged perspective view of the traveling drive unit disposed at the rear side of the mobility according to embodiments of the present disclosure when viewed in a second direction.
Figure 9:
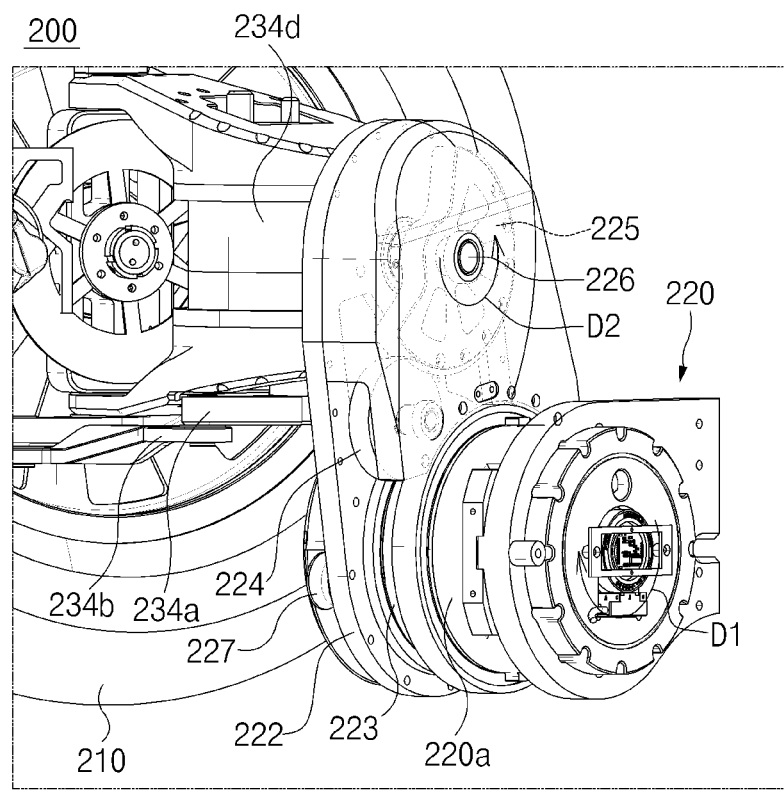
FIG. 9 is an enlarged view of a suspension module of the traveling drive unit disposed at the rear side of the mobility according to embodiments of the present disclosure.

FIG. 7 is an enlarged perspective view of the traveling drive unit disposed at the rear side of the mobility according to embodiments of the present disclosure when viewed in a first direction, and FIG. 8 is an enlarged perspective view of the traveling drive unit disposed at the rear side of the mobility according to embodiments of the present disclosure when viewed in a second direction. FIG. 9 is an enlarged view of the suspension module of the traveling drive unit disposed at the rear side of the mobility according to embodiments of the present disclosure.

The traveling drive unit disposed at the rear side of the mobility 10 will be described below with reference to FIGS. 7 to 9. However, the contents to be described below with reference to FIGS. 7 to 9 may be equally applied to the traveling drive unit disposed at the front side of the mobility 10.

Referring to FIGS. 7 and 8, the traveling drive unit 200 may further include a steering module 230 disposed at one side of the traveling wheel 210 and configured to steer the traveling wheel 210.

The steering module 230 may include a steering power supply member configured to provide a rotational force and a link module 234 including a plurality of link members configured to move by receiving the rotational force from the steering power supply member. For example, the steering power supply member may be a motor, and one side of the link module 234 may rotate about a rotary shaft of the motor. Meanwhile, FIGS. 7 and 8 illustrate that the steering module 230 is coupled to the other side of the rotary link 222 of the suspension module 220.

More specifically, the link module 234 may include a first link member 234a having one side rotatably coupled to the steering power supply member, a second link member 234b having one side rotatably coupled to the first link member 234a, a third link member 234c having one side rotatably coupled to the second link member 234b, the third link member 234c extending from one side toward the traveling wheel 210, and a fourth link member 234d having one side rotatably coupled to the first link member 234a and the other side rotatably coupled to the third link member 234c. For example, the fourth link member 234d may have an approximately U-shape, and two opposite ends of the U-shape may be fixed to the traveling wheel 210. The first to fourth link members 234a, 234b, 234c, and 234d of the link module 234 may be understood as defining a four-bar link. In addition, the steering power supply member may be accommodated in the fourth link member 234d. Therefore, unlike the first to third link members 234a, 234b, and 234c, the fourth link member 234d may be fixed regardless of whether the steering power supply member operates.

In particular, according to embodiments of the present disclosure, the traveling wheel 210 may be steered in conjunction with the rotation of the third link member 234c relative to the fourth link member 234d of the link module 234. More specifically, the link module 234 may further include a fifth link member 234e disposed in a region in which the third link member 234c and the fourth link member 234d are coupled, the fifth link member 234e extending in an upward/downward direction and fixedly coupled to the traveling wheel 210. The fifth link member 234e may rotate together with the third link member 234c in conjunction with the rotation of the third link member 234c relative to the fourth link member 234d. More particularly, the fifth link member 234e may be fixedly coupled to a rotary shaft (not illustrated) fixed to the third link member 234c and disposed in the region in which the third link member 234c and the fourth link member 234d are rotatably coupled. Therefore, when the rotational force provided by the steering power supply member is transmitted to the third link member 234c through the first link member 234a and the second link member 234b, the third link member 234c rotates relative to the fourth link member 234d, and the rotary shaft fixed to the third link member 234c also rotates. Therefore, the fifth link member 234e connected to the rotary shaft rotates, and as a result, the traveling wheel 210 fixedly coupled to the fifth link member 234e may be steered. That is, according to embodiments of the present disclosure, the fifth link member 234e may serve as a steering center axis of the traveling wheel 210.

Meanwhile, a partial region of the traveling wheel 210 of the traveling drive unit 200 is in contact with the ground surface. In the present specification, the region of the traveling wheel 210 that is in contact with the ground surface is referred to as a patch region.

Meanwhile, power required to steer the traveling wheel 210 is minimized when the steering center axis (i.e., the fifth link member) of the traveling wheel 210 is positioned in the patch region and parallel to a direction in which the steering center axis extends upward from the patch region. However, in a case in which the suspension module 220 operates and rotates the traveling wheel 210 in a state in which there is no separate component in the traveling drive unit 200, the steering center axis of the traveling wheel 210 deviates from the patch region or is not parallel to the direction in which the steering center axis of the traveling wheel 210 extends upward from the patch region, depending on a rotation angle of the traveling wheel 210 made by the operation of the suspension module 220 because the steering module 230 and the suspension module 220 are fixed to each other.

Therefore, according to embodiments of the present disclosure, the suspension module 220 may include a plurality of gear components so that regardless of the rotation of the traveling wheel 210 made by the operation of the suspension module 220, the steering center axis of the traveling wheel 210 is positioned in the patch region and always parallel to the direction in which the steering center axis extends upward from the patch region.

More specifically, referring to FIG. 9, the suspension module 220 may further include a first gear 223. The first gear 223 may be fixed regardless of the operation of the suspension power supply member 221. For example, the suspension module 220 may further include a module housing 220a configured to accommodate the suspension power supply member, and the first gear 223 may be fixedly coupled to the module housing 220a. Therefore, the first gear 223 may be fixed to the module housing 220a regardless of an angle by which the rotary link 222 rotates relative to the suspension power supply member 221 as the suspension power supply member 221 operates.

In addition, the suspension module 220 may further include a second gear 224 configured to engage with the first gear 223 and a third gear 225 configured to engage with the second gear 224. The second gear 224 and the third gear 225 may be accommodated in the rotary link 222.

In this case, according to embodiments of the present disclosure, the suspension module 220 may further include a rotation connecting shaft 226 configured to transmit a rotational force of the third gear 225 to the steering module 230. More specifically, the steering module 230 may rotate together with the third gear 225 in conjunction with a rotational motion of the third gear 225.

According to embodiments of the present disclosure based on the above-mentioned contents, when the suspension power supply member 221 operates and the rotary link 222 rotates in a first direction D1 in a state in which the first to third gears 223, 224, and 225 are not present, the steering module 230 also rotates in the first direction D1. In this case, the steering center axis is inclined while also rotating in the first direction D1.

Meanwhile, as the rotary link 222 rotates, the second gear 224 provided in the rotary link 222 revolves around the first gear 223 while rotating about its center simultaneously. More specifically, the coupling relationship between the first gear 223 and the second gear 224 allows the second gear 224 to perform the revolution and rotation in a direction identical to the direction in which the suspension power supply member 221 and the rotary link 222 rotate. For example, when the suspension power supply member 221 rotates in the first direction D1 and thus the rotary link 222 also rotates in the first direction D1, the second gear 224 revolves around the first gear 223 in the first direction D1 while rotating about its center in the first direction D1 simultaneously.

Meanwhile, the third gear 225 engaging with the second gear 224 rotates about its center by receiving power from the second gear 224. In this case, the rotation direction of the third gear 225 is opposite to the rotation direction of the second gear 224, and the steering module 230 connected to the third gear 225 through the rotation connecting shaft 226 also rotates about its center, together with the third gear 225, in the direction opposite to the rotation direction of the second gear 224. That is, according to embodiments of the present disclosure, the rotation direction of the rotary link 222 relative to the suspension power supply member and the rotation direction of the steering module 230 are opposite to each other. Therefore, it is possible to prevent the steering center axis from being inclined by the operation of the suspension module 220.

For example, when the suspension power supply member rotates in the first direction D1 and thus the rotary link 222 also rotates in the first direction D1, the third gear 225 rotates in a second direction D2 opposite to the first direction D1. In addition, since the third gear 225 and the steering module 230 are connected to each other by the rotation connecting shaft 226, the steering module 230 also rotates in the second direction D2.

In particular, according to an exemplary embodiment of the present disclosure, the number of teeth of the first gear 223 may be equal to the number of teeth of the third gear 225. In this case, the angle by which the rotary link 222 rotates in the first direction D1 relative to the suspension power supply member 221 is always equal to the angle by which the third gear 225 and the steering module 230 rotate in the second direction D2. Therefore, the fifth link member 234e, i.e., the steering rotary shaft may always be positioned in the patch region, and the steering rotary shaft may always be parallel to the direction in which the steering center axis extends upward from the patch region.

Figure 10:
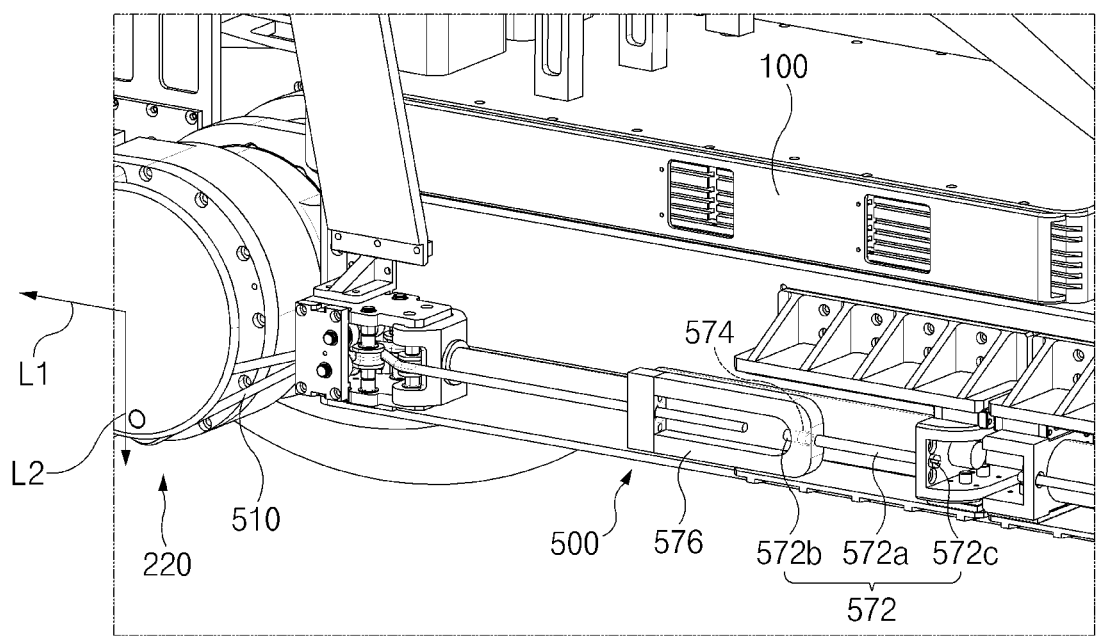
FIG. 10 is a perspective view illustrating a state in which the traveling drive unit and a suspension assistant unit of the mobility according to embodiments of the present disclosure are coupled.
Figure 11:
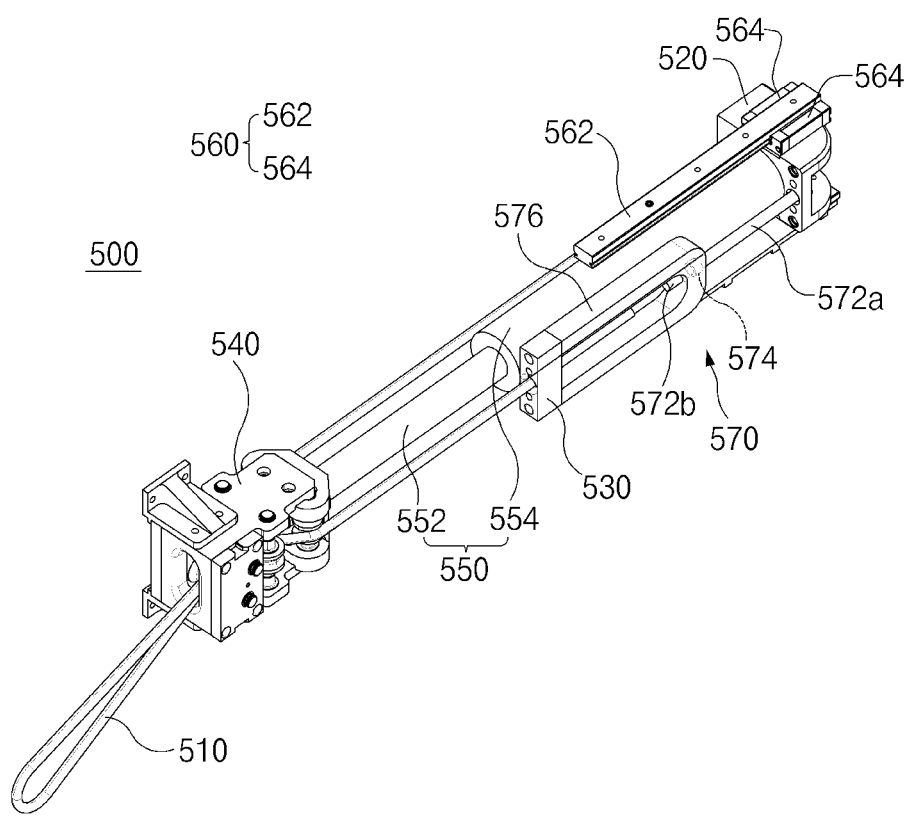
FIG. 11 is a view illustrating the suspension assistant unit of the mobility according to embodiments of the present disclosure.

FIG. 10 is a perspective view illustrating a state in which the traveling drive unit and a suspension assistant unit of the mobility according to embodiments of the present disclosure are coupled, and FIG. 11 is a view illustrating the suspension assistant unit of the mobility according to embodiments of the present disclosure.

Meanwhile, the mobility 10 according to embodiments of the present disclosure may further include a configuration that assists the suspension module 220 to reduce power required for the suspension module 220 to change the position of the traveling wheel 210.

More specifically, as illustrated in FIGS. 10 and 11, the mobility may further include a suspension assistant unit 500 having one side coupled to the frame unit 100 and the other side coupled to the suspension module 220, the suspension assistant unit 500 being configured to pull the suspension module 220. More specifically, the suspension assistant unit 500 may include a wire member 510 configured to pull one side of the suspension module 220 and having one side coupled to the suspension module 220.

Referring to FIGS. 10 and 11, the suspension assistant unit 500 may include a first wire fixing region 520 to which one end of the wire member 510 is fixed, and a second wire fixing region 530 to which the other end of the wire member 510 is fixed. In this case, the wire member 510 may be shaped to extend from one end of the wire member 510 to the suspension module 220 and then extend to the other end of the wire member 510.

The suspension assistant unit 500 may further include a support member 540 fixed relative to the frame unit 100 and penetrated by the wire member 510. The configuration in which the support member 540 is fixed relative to the frame unit 100 may mean not only a configuration in which the support member 540 is fixedly coupled directly to the frame unit 100, but also a configuration in which the support member 540 is indirectly fixed to the frame unit 100 by means of another component. These configurations may be equally applied to the following contents with respect to the relative fixing between the support member and the frame unit. More particularly, the support member 540 may be fixedly coupled directly to the frame unit 100.

Meanwhile, the suspension assistant unit 500 may further include an elastic module 550 having one side fixedly coupled to the support member 540. Since the wire member 510 may be coupled to the suspension module 220 as described above, a position of a region in which the wire member 510 is coupled to the suspension module 220 may vary as the suspension module 220 operates. The elastic module 550 may be reversibly deformed in shape in response to the above-mentioned change in position of the wire member 510 and always pull the wire member 510 by applying an elastic force, thereby applying tension of the wire member 510. Therefore, the elastic module 550 may be configured to pull the suspension module 220 toward the suspension assistant unit 500. Meanwhile, the first and second wire fixing regions 520 and 530 may be fixed relative to the other side of the elastic module 550. More particularly, the first and second wire fixing regions 520 and 530 may be fixedly coupled directly to the other side of the elastic module 550.

More specifically, the elastic module 550 may include a first member 552 fixedly coupled to the support member 540 and a second member 554 coupled to the first member 552 in an insertion manner and movable relative to the first member 552. For example, FIGS. 10 and 11 illustrate that a diameter of the first member 552 is smaller than a diameter of the second member 554, and the first member 552 is coupled to and inserted into an internal space of the second member 554. However, unlike the configuration illustrated in FIGS. 10 and 11, a diameter of the first member 552 may be larger than a diameter of the second member 554, and the second member 554 may be coupled to and inserted into an internal space of the first member 552. Meanwhile, according to embodiments of the present disclosure, the first and second wire fixing regions 520 and 530 may be fixed relative to the second member 554. FIGS. 10 and 11 illustrate that the first and second wire fixing regions 520 and 530 are fixedly coupled directly to the second member 554.

Meanwhile, the elastic module 550 may be a gas spring. The gas spring has a remarkably smaller elastic modulus than other elastic means. Therefore, an extremely small change in elastic force is caused by displacement between the two components (i.e., the first member 552 and the second member 554) constituting the gas spring. Therefore, the elastic module 550 may pull the wire member 510 with a constant force regardless of the position of the wire member 510 based on the operation of the suspension module 220. However, the above-mentioned contents do not mean that other elastic means (e.g., springs) cannot be applied as the elastic module 550.

Referring to FIGS. 10 and 11, the suspension assistant unit 500 may further include a guide module 560 having one side fixed relative to the frame unit 100, and the other side fixed relative to the second member 554. More specifically, the guide module 560 may include a rail member 562 fixed to the frame unit 100 and movable members 564 fixed relative to the second member 554 and movable along the rail member 562. Therefore, according to embodiments of the present disclosure, the second members 554 may be movable relative to the frame unit 100. For example, the guide module 560 may be an LM guide. Meanwhile, FIG. 11 illustrates that the first wire fixing region 520 is fixedly coupled to the second member 554, and the first wire fixing region 520 is fixedly coupled to the movable members 564. In this case, the second member 554, the first wire fixing region 520, and the movable members 564 may be fixed relative to one another.

Meanwhile, the suspension assistant unit 500 may further include a tension adjustment module 570 configured to adjust tension of the wire member 510. More specifically, the tension adjustment module 570 may be configured to keep the wire member 510 in a tense state and allow the elastic module 550 to effectively pull the suspension module 220 by means of the wire member 510.

More specifically, the tension adjustment module 570 may include a restriction member 576 fixedly coupled to the second wire fixing region 530 and the second member 554 of the elastic module 550, a bolt member 572 configured to penetrate the restriction member 576, and a nut member 574 coupled to the bolt member 572.

In this case, the bolt member 572 may be divided into a plurality of parts depending on positions relative to the restriction member 576. More specifically, the bolt member 572 may include a first part 572a provided outside the restriction member 576 and a second part 572b extending from the first part 572a and facing the first part 572a with a region in which the bolt member 572 penetrates the restriction member 576 interposed therebetween. In this case, the nut member 574 may be coupled to the second part 572b. That is, according to embodiments of the present disclosure, the first part 572a and the nut member 574 may face each other with the region in which the bolt member 572 penetrates the restriction member 576 interposed therebetween. Therefore, when the bolt member 572 rotates to adjust the tension of the wire member 510, the interference between the restriction member 576 and the nut member 574 moves the restriction member 576 and the nut member 574 together.

Referring to FIGS. 10 and 11, the bolt member 572 of the tension adjustment module 570 may penetrate the first wire fixing region 520. Therefore, the first part 572a of the bolt member 572 may be disposed between the first wire fixing region 520 and the restriction member 576.

In this case, the bolt member 572 may further include a third part 572c extending from the first part 572a and facing the first part 572a with the region in which the bolt member 572 penetrates the first wire fixing region 520 interposed therebetween. A size of the third part 572c may be larger than a size of the through-hole formed in a region of the first wire fixing region 520 that is penetrated by the bolt member 572. Therefore, a translational motion of the bolt member 572 relative to the first wire fixing region 520 may be restricted even though the bolt member 572 rotates. Meanwhile, as illustrated in FIG. 11, a region of the first wire fixing region 520 to which the wire member 510 is fixed and a region of the first wire fixing region 520 to which the bolt member 572 is coupled may face each other with the second member 554 of the elastic module 550 interposed therebetween. It can be understood that the second member 554 is coupled to the first wire fixing region 520 in an insertion manner.

An operational principle of the tension adjustment module 570 will be described below on the basis of the above-mentioned description. When a user intends to change the tension of the wire member 510, the user rotates the bolt member 572 by using the third part 572c. In this case, since the bolt member 572 does not translationally move relative to the first wire fixing region 520 as described above, the restriction member 576 and the nut member 574 coupled to the bolt member 572 translationally move, such that a distance between the first wire fixing region 520 and the restriction member 576 changes. Therefore, a length of the wire member 510 may also be changed, and as a result, the tension of the wire member 510 may be adjusted.

Meanwhile, referring to FIGS. 6 and 10, the suspension module 220 may further include a pulley member 227 disposed at one side of the rotary link 222. In this case, the wire member 510 may be shaped to extend from one end (i.e., the region fixed to the first wire fixing region) of the wire member 510 to the pulley member 227, may be bent at the pulley member 227, and then may extend to the other end (i.e., the region fixed to the second wire fixing region) of the wire member 510. The pulley member 227 is a portion to which a pulling force is directly applied by the tension of the wire member 510. The rotational torque may be applied to the rotary link 222 by the tension of the wire member 510 applied by the pulley member 227. Therefore, the pulley member 227 may supplement torque required for the suspension module 220 to operate the rotary link 222.

More specifically, the pulley member 227 may rotate about an axis about which the rotary link 222 is rotatably coupled to the suspension power supply member 221.

Meanwhile, as illustrated in FIG. 10, the pulley member 227 may be disposed below the axis about which the rotary link 222 is rotatably coupled to the suspension power supply member 221. In this case, the wire member 510 pulls a lower region of the rotary link 222. Therefore, based on FIG. 10, the rotary link 222 rotates counterclockwise about the axis about which the rotary link is rotatably coupled to the suspension power supply member 221, thereby providing auxiliary torque that allows the traveling wheel 210 to move downward relative to the frame unit 100.

Meanwhile, referring to FIG. 10, a longitudinal direction L1 in which the rotary link 222 extends may be perpendicular to a direction L2 in which the pulley member 227 is spaced apart from the axis about which the rotary link 222 is rotatably coupled to the suspension power supply member 221. This is to maximize the auxiliary torque applied to the rotary link 222 by the suspension assistant unit 500 when the rotary link 222 is disposed in parallel with the ground surface. That is, according to embodiments of the present disclosure, a magnitude of the auxiliary torque applied to the rotary link 222 by the suspension assistant unit 500 may decrease as the rotary link 222 rotates in a direction inclined with respect to the ground surface.

The present disclosure has been described with reference to the limited embodiments and the drawings, but the present disclosure is not limited thereto. The present disclosure may be carried out in various forms by those skilled in the art, to which the present disclosure pertains, within the technical spirit of the present disclosure and the scope equivalent to the appended claims.

What is claimed is:

1. A mobility vehicle comprising:
a frame unit;
a traveling drive unit disposed at a front or rear side of the frame unit and comprising a traveling wheel and a suspension module configured to change a position of the traveling wheel relative to the frame unit; and
a suspension assistant unit having a first side coupled to the frame unit and a second side coupled to the suspension module, the suspension assistant unit comprising a wire member configured to pull the suspension module and having a first side coupled to the suspension module, wherein the suspension assistant unit comprises:
a first wire fixing region to which a first end of the wire member is fixed;
a second wire fixing region to which a second end of the wire member is fixed, wherein the wire member is shaped to extend from the first end of the wire member to the suspension module and then extend to the second end of the wire member;
a support member fixed relative to the frame unit and penetrated by the wire member; and
an elastic module having a first side fixedly coupled to the support member, wherein the first wire fixing region and the second wire fixing region are fixed relative to a second side of the elastic module.

2. A mobility vehicle of claim 1, wherein the elastic module comprises:
a first member fixedly coupled to the support member; and
a second member into which the first member is inserted, the second member movable relative to the first member, wherein the first wire fixing region and the second wire fixing region are fixed relative to the second member.

3. The mobility vehicle of claim 2, wherein the suspension assistant unit further comprises a guide module having a first side fixed relative to the frame unit and a second side fixed relative to the second member, the guide module comprising:
a rail member fixed relative to the frame unit; and
a movable member fixed relative to the second member and movable along the rail member.

4. The mobility vehicle of claim 3, wherein the suspension assistant unit further comprises a tension adjustment module configured to adjust tension of the wire member, the tension adjustment module comprising:
a restriction member fixedly coupled to the second wire fixing region and the second member;
a bolt member configured to penetrate the restriction member in a region, the bolt member comprising:
a first part disposed outside the restriction member; and
a second part extending from the first part and facing the first part with the region in which the bolt member penetrates the restriction member interposed therebetween; and
a nut member coupled to the second part of the bolt member.

5. The mobility vehicle of claim 4, wherein:
the bolt member penetrates the first wire fixing region in a second region;
the first part is disposed between the first wire fixing region and the restriction member;
the bolt member further comprises a third part extending from the first part and facing the first part with the second region in which the bolt member penetrates the first wire fixing region interposed therebetween; and
a size of the third part is larger than a size of a through-hole formed in the second region of the first wire fixing region penetrated by the bolt member.

6. The mobility vehicle of claim 1, wherein the elastic module comprises a gas spring.

7. The mobility vehicle of claim 1, further comprising an operation unit coupled to a first side of the frame unit, the operation unit comprising:
a handle member;
an operation unit body to which the handle member is coupled; and
a pedal unit coupled to the operation unit body and comprising an accelerator pedal and a brake pedal;
wherein a through-hole extending in a forward/rearward direction is formed in a region of the operation unit body to which the pedal unit is coupled; and
wherein the pedal unit is coupled to the through-hole and configured to be movable in the forward/rearward direction in which the through-hole extends.

8. The mobility vehicle of claim 1, further comprising a chair unit coupled to a first side of the frame unit, the chair unit comprising:
a chair body configured to support an occupant and to provide a space for the occupant to sit;
a chair body fixing member fixedly coupled to the frame unit and disposed on a lower side of the chair body; and a clamp member fixedly coupled to the chair body and configured to be movable relative to the chair body fixing member.

9. A mobility vehicle comprising:
a frame unit;
a traveling drive unit disposed at a front or rear side of the frame unit and comprising a traveling wheel and a suspension module configured to change a position of the traveling wheel relative to the frame unit, the suspension module comprising:
  a suspension power supply member configured to provide a rotational force; and
  a rotary link having a first side rotatably connected to the suspension power supply member and a second side coupled to the traveling wheel; and
a suspension assistant unit having a first side coupled to the frame unit and a second side coupled to the suspension module, the suspension assistant unit comprising:
  a wire member configured to pull the suspension module and having a first side coupled to the suspension module;
  a first wire fixing region to which a first end of the wire member is fixed; and
  a second wire fixing region to which a second end of the wire member is fixed, wherein the wire member is shaped to extend from the first end of the wire member to the suspension module and then extend to the second end of the wire member.

10. The mobility vehicle of claim 9, wherein:
the suspension module further comprises a pulley member disposed at a first side of the rotary link; and
the wire member is shaped to extend from the first end of the wire member to the pulley member, be bent at the pulley member, and then extend to the second end of the wire member.

11. The mobility vehicle of claim 10, wherein the pulley member is rotatable about an axis about which the rotary link is rotatably coupled to the suspension power supply member.

12. The mobility vehicle of claim 11, wherein the pulley member is disposed below the axis about which the rotary link is rotatably coupled to the suspension power supply member.

13. The mobility vehicle of claim 10, wherein a first longitudinal direction in which the rotary link extends is perpendicular to a second direction in which the pulley member is spaced apart from an axis about which the rotary link is rotatably coupled to the suspension power supply member.

14. A mobility vehicle comprising:
a frame unit;
a traveling drive unit disposed at a front or rear side of the frame unit, the traveling drive unit comprising:
  a traveling wheel;
  a suspension module configured to change a position of the traveling wheel relative to the frame unit; and
  a steering module disposed at a first side of the traveling wheel and configured to steer the traveling wheel, the steering module comprising:
    a steering power supply member configured to provide a rotational force; and
    a link module comprising a plurality of link members configured to move by receiving the rotational force from the steering power supply member, the link module comprising a first link member having one side rotatably coupled to the steering power supply member, a second link member having one side rotatably coupled to the first link member, a third link member having one side rotatably coupled to the second link member, and a fourth link member having a first side rotatably coupled to the first link member and a second side rotatably coupled to the third link member, wherein the traveling wheel is steered in conjunction with a rotation of the third link member relative to the fourth link member; and
a suspension assistant unit having a first side coupled to the frame unit and a second side coupled to the suspension module, the suspension assistant unit comprising:
  a wire member configured to pull the suspension module and having a first side coupled to the suspension module;
  a first wire fixing region to which a first end of the wire member is fixed; and
  a second wire fixing region to which a second end of the wire member is fixed, wherein the wire member is shaped to extend from the first end of the wire member to the suspension module and then extend to the second end of the wire member.

15. The mobility vehicle of claim 14, wherein:
the link module further comprises a fifth link member fixedly coupled to the traveling wheel and extending in an upward/downward direction in a region in which the third link member and the fourth link member are coupled; and
the fifth link member is configured to rotate together with the third link member in conjunction with the rotation of the third link member relative to the fourth link member.

16. The mobility vehicle of claim 14, wherein the suspension module comprises:
  a suspension power supply member configured to provide a rotational force;
  a rotary link having a first side rotatably connected to the suspension power supply member and a second side coupled to the traveling wheel;
  a first gear configured to rotate about its center by receiving the rotational force from the suspension power supply member;
  a second gear accommodated in the rotary link and configured to engage with the first gear; and
  a third gear accommodated in the rotary link and configured to engage with the second gear.

17. The mobility vehicle of claim 16, wherein the suspension module further comprises a rotation connecting shaft configured to transmit a rotational force of the third gear to the steering module.

18. The mobility vehicle of claim 17, wherein a number of teeth of the first gear is equal to a number of teeth of the third gear.

* * * * *